Oct. 5, 1937.   J. BURKHARTSMEIER   2,094,941
AUTOMATIC BLADE ADJUSTER FOR WIND MOTORS
Filed Sept. 11, 1936   5 Sheets-Sheet 1

Inventor

J. Burkhartsmeier.

By Clarence A. O'Brien and
Hyman Berman
Attorneys

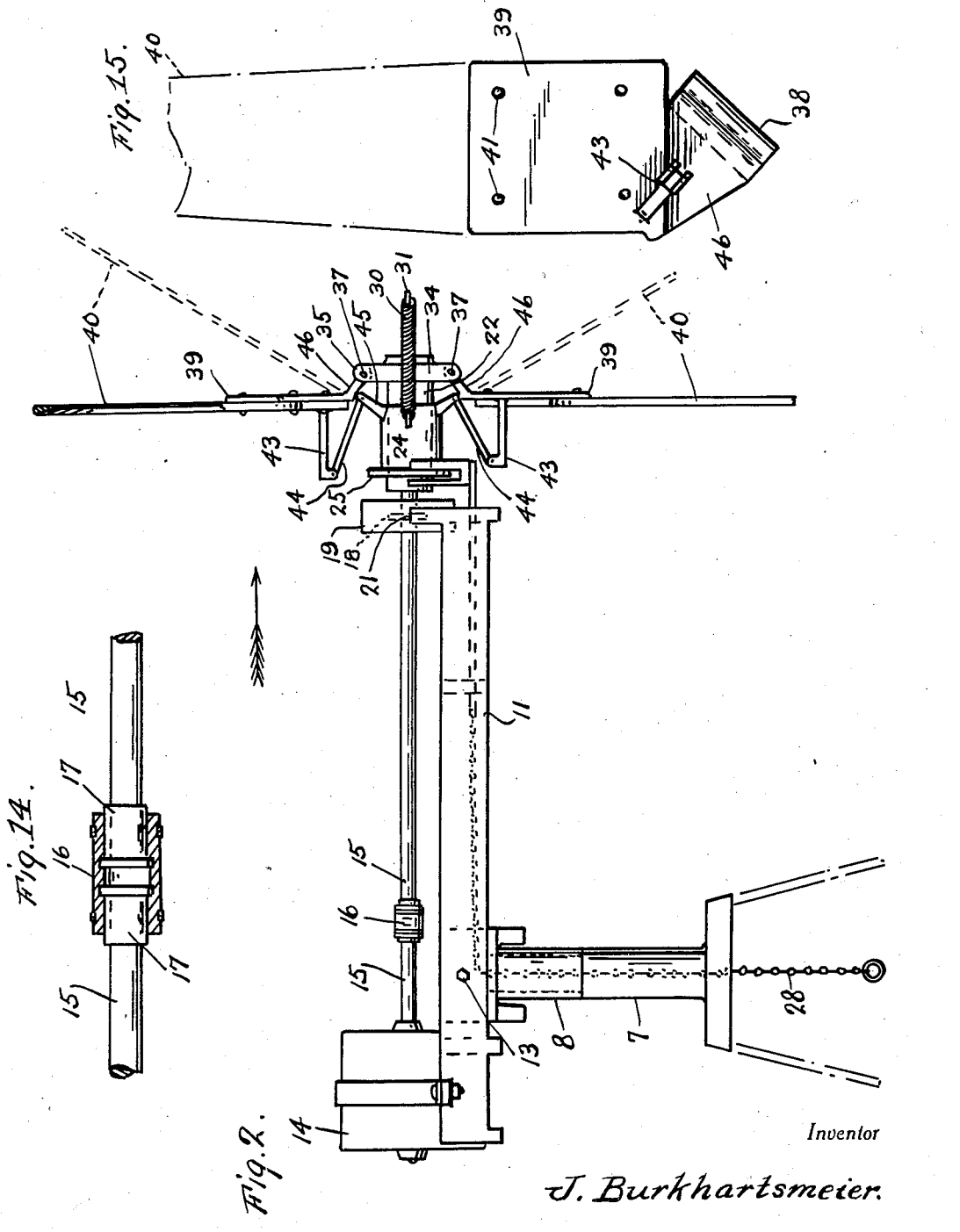

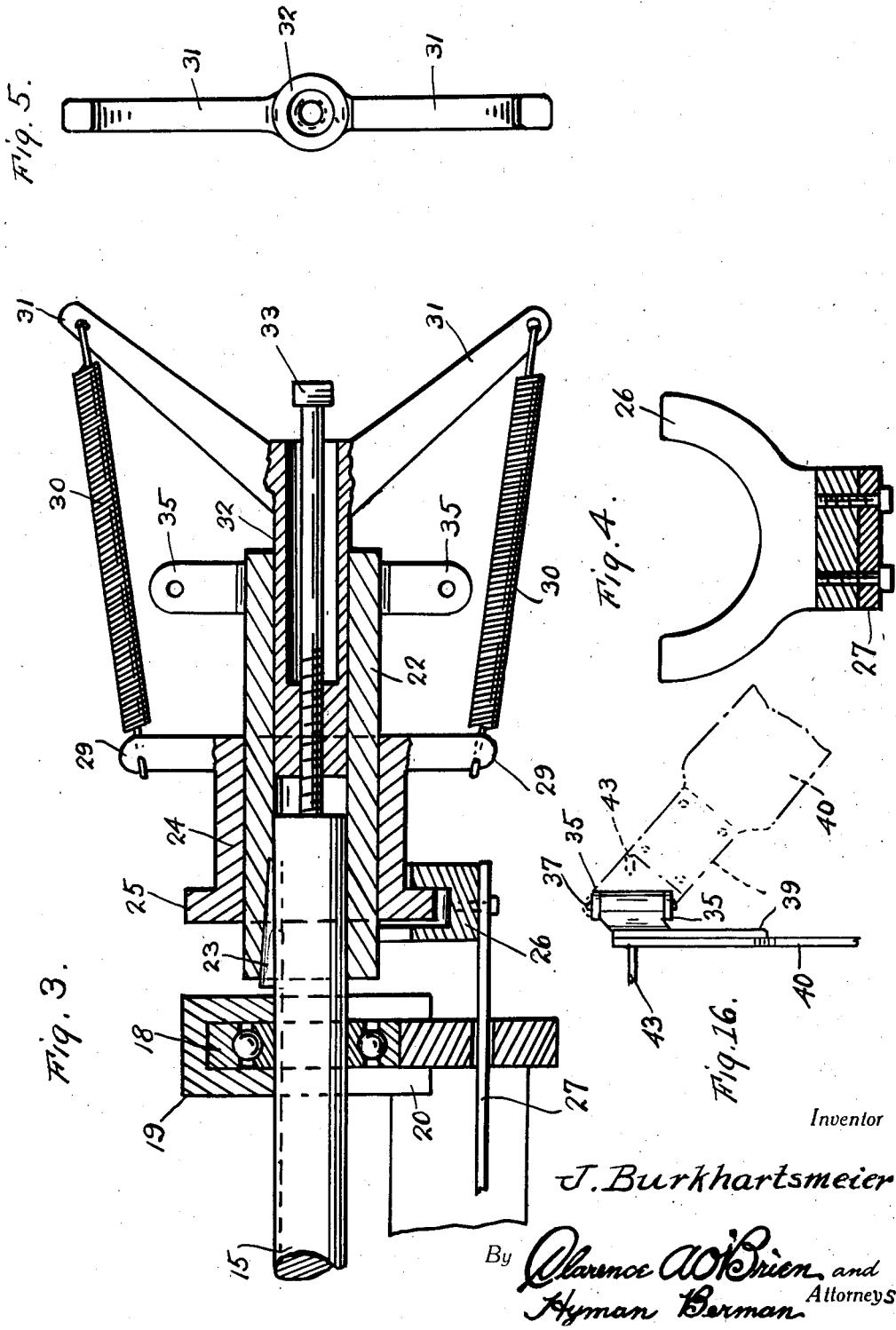

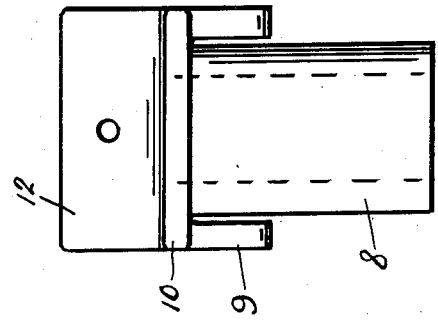
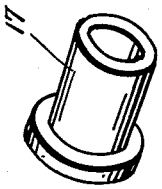
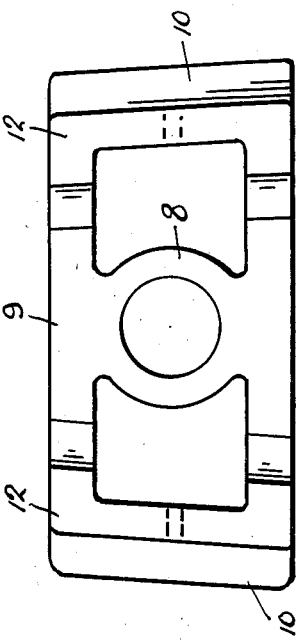
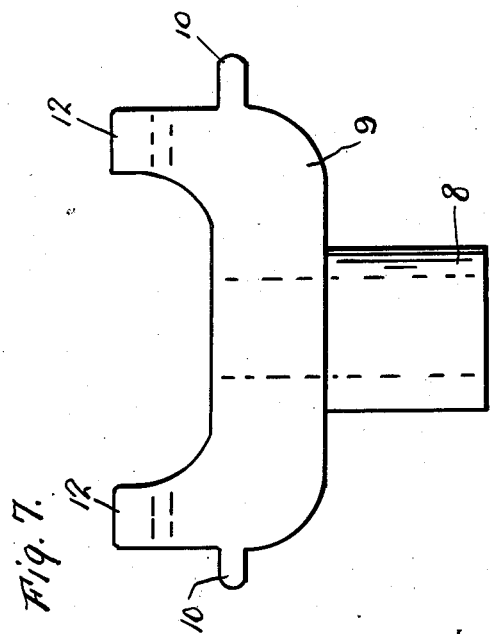

Oct. 5, 1937.    J. BURKHARTSMEIER    2,094,941
AUTOMATIC BLADE ADJUSTER FOR WIND MOTORS
Filed Sept. 11, 1936    5 Sheets-Sheet 5
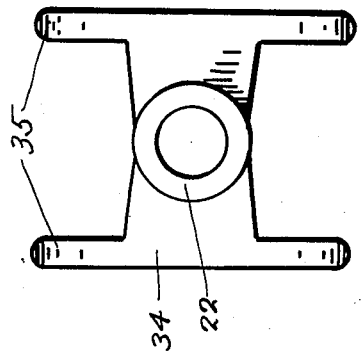
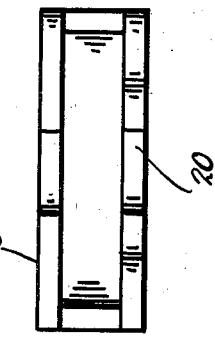
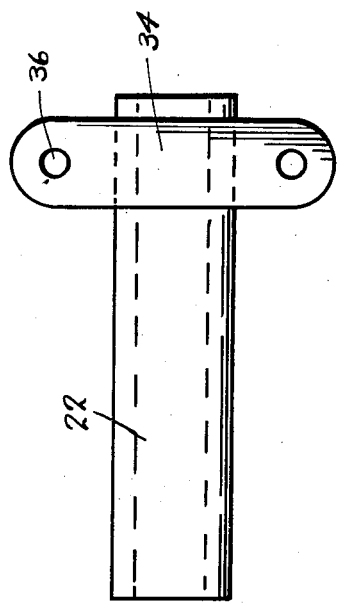
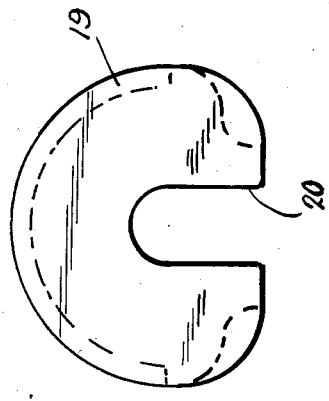
Inventor
J. Burkhartsmeier.
By Clarence A. O'Brien and
Hyman Berman
Attorneys Patented Oct. 5, 1937

2,094,941

UNITED STATES PATENT OFFICE 2,094,941

AUTOMATIC BLADE ADJUSTER FOR WIND MOTORS

Joseph Burkhartsmeier, Towner, N. Dak.

Application September 11, 1936, Serial No. 100,341

4 Claims. (Cl. 170—69)

The present invention relates to wind motors in which a plurality of wind driven blades are utilized to generate power and has for its principal object to provide an automatic mechanism for adjusting the blades so that the same will be driven at a substantially uniform speed.

A further object is to provide an automatic blade adjusting mechanism which is arranged to adjust the angle or pitch of the blade relative to the axis of the blade as well as to adjust the angle of inclination of the blade longitudinally of the driving force.

Another object is to provide an automatic blade adjusting mechanism responsive to the speed of rotation of the blade to regulate the angle of the blade, together with spring means for returning the blade to a normal operating position and means for adjusting the tension of the spring means to retard or accelerate the speed responsive adjustment of the blade.

A still further object of the invention is to provide a wind power generating apparatus which is simple and practical in construction, easily assembled for operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:—

Figure 2 is a side elevational view.

Figure 3 is a longitudinal sectional view through the adjustable hub for the blade.

Figure 4 is a detail of the yoke for manually adjusting the blade.

Figure 5 is an end elevational view of the adjusting member.

Figures 6, 7 and 8 are details of the supporting saddle for the generator and shaft frame.

Figure 9 is a detail of one end of the flexible shaft coupling.

Figures 10 and 11 are details of the pivotal connection for the blade.

Figures 12 and 13 are details of the ball bearing cage.

Figure 14 is a longitudinal sectional view of the shaft coupling.

Figure 15 is a fragmentary side elevational view of one of the blades showing the bearing plate and Figure 16 is a fragmentary detail of the pivot of the blade showing the manner in which the pitch is adjusted.

Figure 1:
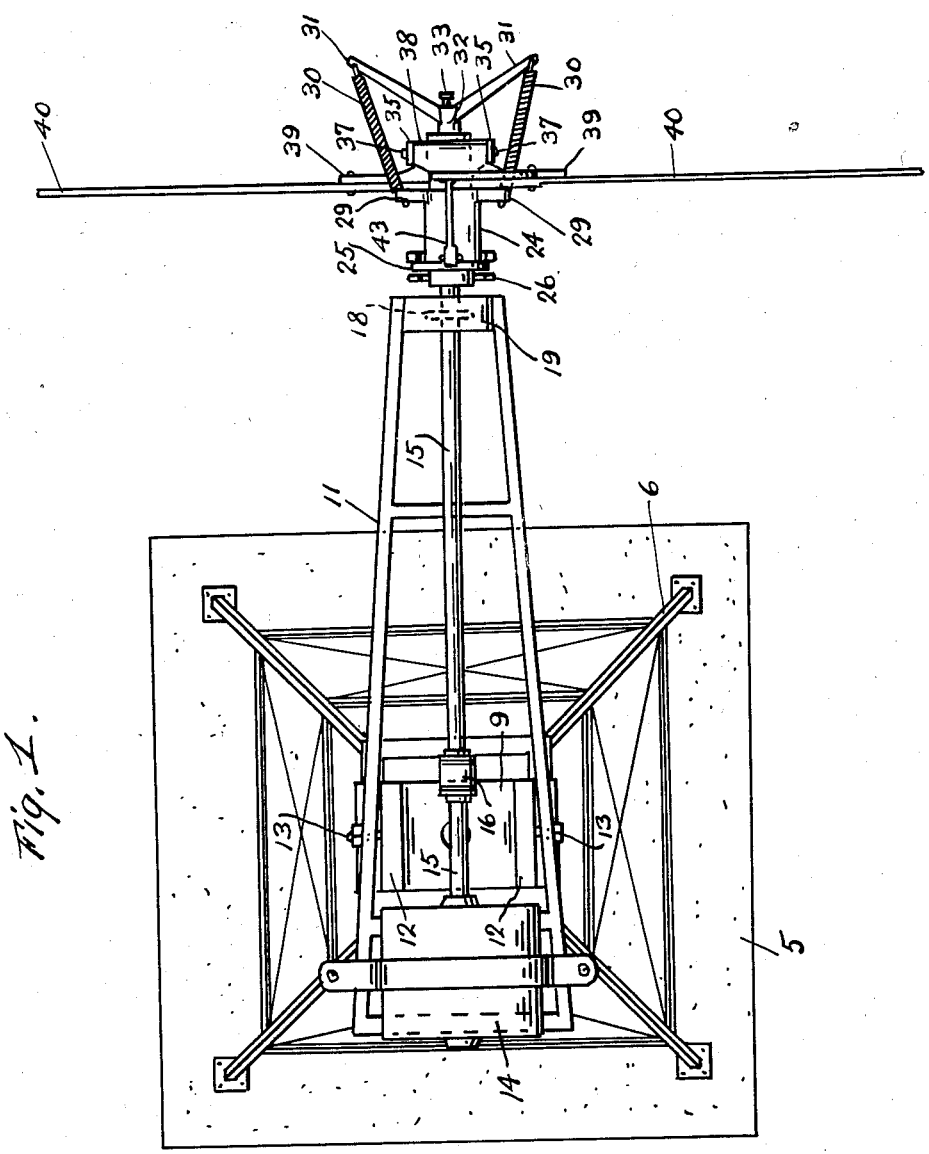
Figure 1 is a top plan view.

Referring now to the drawings in detail wherein for the purpose of illustration I have disclosed a preferred embodiment of the invention, the numeral 5 designates a base upon which an upright frame structure 6 is supported, the upper portion of the frame being provided with a tubular post 7, an upper section 8 of which is rotatably mounted on said post. The upper end of the section 8 is formed into a saddle 9 having a pair of shoulders 10 on opposite sides thereof for supporting a horizontally positioned frame 11, bolted to the upstanding sides 12 of the saddle as shown at 13.

On one end of the frame 11 is clamped a generator 14 having a shaft 15 extending from one side thereof. The shaft 15 is preferably formed in sections, as more clearly illustrated in Figure 14 of the drawings, the sections of the shaft being connected by a coupling member 16 of flexible construction clamped about the collars 17 mounted on the adjacent ends of the shaft sections.

The shaft 15 extends longitudinally of the frame 11 and the end of the shaft remote from the generator is rotatably mounted in a ball bearing assembly 18 contained within a cage 19, said cage being shown in detail in Figures 12 and 13 of the drawings and formed with an open side 20 for removably mounting the cage on the shaft, the opposite side edges of the cage being secured to the end of the frame 11 as at 21.

The end of the shaft 15 is provided with a sleeve 22 keyed to the shaft as shown at 23. Slidably mounted on the sleeve 22 is a collar 24 having a flange 25 on one end thereof seated within a yoke 26, said yoke having an operating rod 27 attached thereto, the rod extending longitudinally of the frame 11 and having a manually operated chain 28 attached to the rod, the chain being fed through the tubular post 7 for operation of the collar 24 for a purpose to be hereinafter explained.

The collar 24 is also provided with a pair of radially extending arms 29 to which one end of expansible coil springs 30 are attached, the opposite ends of the springs being connected to a pair of radially inclined arms 31 formed on the outer ends of an adjusting stem 32. An adjusting bolt 33 is threaded through the stem 32, the stem being slidably mounted in the outer end of the sleeve 22, as more clearly illustrated in Figure 3 of the drawings, and with the inner end of the bolt 33 abutting the end of the shaft 15 to adjust the stem longitudinally with respect to the sleeve and as a consequence to increase or decrease extension of the springs 30.

The outer end of the sleeve 22 is also provided with a pair of bearing brackets 34 which comprise spaced parallel extensions 35 having openings 36 therein for receiving bearing pins 37. The pins 37 are adapted to rotatably support bearings 38 formed on the inner ends of plates 39 to which propeller blades 40 are suitably attached as shown at 41. To the rear faces of the plates 39 are secured one end of a horizontally positioned rod 43, the opposite end of the rod 43 being pivotally connected by a link 44 to a radially inclined arm 45 on the collar 24.

As more clearly illustrated in Figures 1, 2 and 15 of the drawings, the bearing 38 on the inner end of the blade is inclined with respect to the axis of the blade and in a direction to cause a feathering of the blade when the blade is pivoted rearwardly or in a direction indicated by the dotted lines in Figure 2 and the adjacent end of the plate is offset from the surface of the blade and also angularly positioned as shown at 46 so that the blade will normally extend radially with respect to the shaft 15. It will also be noted from an inspection of Figure 2 of the drawings that the angular portion 46 of the plate 39 abuts the outer end of the radial arms 45.

By reason of the inclined position of the bearing 38 of the blade it will be apparent that when the blade swings on its pivot from the position shown in full lines in Figure 2 to the dotted line position that the angle or pitch of the blade will also be changed whereby to cause a feathering action of the blade.

With this adjustable movement of the blade in mind, it will be understood that by positioning the device in the manner shown in Figure 2 and the wind moving in a direction shown by the arrow, the blade will normally be held in the full line position by the springs 30 and the generator will be driven at a predetermined speed. Upon an increase in the velocity of the wind the increased rotation of the blade, plus the force of the wind striking the blade, will move the blade to the position shown in dotted line thus causing an angular adjustment of the blade and a consequent reduction in the rotation thereof. By adjusting the stem 32 to regulate the tension of the springs 30 the responsiveness of the blade to the force of the wind will be regulated.

The manual control chain 28 may be utilized to manipulate the blade to an inactive position when desired and by reason of the pivotal mounting of the frame 11 and the fact that the frame is positioned with the blade end offering a greater resistance to the wind, the frame will swing with changes in the direction of the wind to always occupy a position with the blade in a trailing relation.

It is obvious that the invention is susceptible to changes in construction without departing from the spirit of invention or the scope of the appended claims.

Having thus described the invention what I claim is:—

1. A wind motor comprising a driven shaft, blades responsive to the force of the wind for rotating the shaft a bearing on the inner end of the blades offset from the surface thereof and inclined with respect to the longitudinal axis of the blades for pivotally connecting the blades to the shaft for adjusting the pitch of the blades and also for adjusting the angle of inclination of the blades relative to the direction of the wind, said blades also being responsive to an increase in the rotation of the blades and to an increase in the force of the wind to produce said adjustment, and spring means yieldably maintaining the blades in a normal operating position.

2. A wind motor comprising a driven shaft and means for rotating the shaft comprising a sleeve keyed on the shaft, a collar slidable on the sleeve, a plurality of blades having bearings at their inner ends offset from the surface thereof and inclined with respect to the longitudinal axis of the blades for pivotally mounting the blades to the sleeve at an angle to adjust the pitch of the blades upon the pivotal movement thereof, means connecting the collar to the blades, and spring means connected to the collar for yieldably maintaining the blades in a predetermined position, said blades being responsive to an increase in the velocity of the wind to pivotally actuate the blades.

3. A wind motor comprising a driven shaft and means for rotating the shaft comprising a sleeve keyed on the shaft, a collar slidable on the sleeve, a plurality of blades having bearings at their inner ends offset from the surface thereof and inclined with respect to the longitudinal axis of the blades for pivotally mounting the blades to the sleeve at an angle to adjust the pitch of the blades upon the pivotal movement thereof, means connecting the collar to the blades, said blades being responsive to an increase in the velocity of the wind to pivotally actuate the blades, spring means connected to the collar for yieldably maintaining the blades in a predetermined position and means for adjusting the tension of said spring means.

4. A wind motor comprising a driven shaft and means for rotating the shaft comprising a sleeve keyed on the shaft, a collar slidable on the sleeve, a plurality of blades having bearings at their inner ends offset from the surface thereof and inclined with respect to the longitudinal axis of the blades for pivotally mounting the blades to the sleeve at an angle to adjust the pitch of the blades upon the pivotal movement thereof and to move the blades into an inclined position away from the direction of the wind, said blades being responsive to an increase in the velocity of the wind to pivotally actuate the blades, means connecting the collar to the blades, a stem telescopically mounted in the sleeve, spring means connecting the stem to the collar, means for adjusting the stem to regulate the tension of the springs, and manually operated means for pivotally moving the blades into and out of operative position independently of their automatic movement.

JOSEPH BURKHARTSMEIER.